(12) United States Patent
Baker

(10) Patent No.: US 9,844,189 B2
(45) Date of Patent: Dec. 19, 2017

(54) BLADE FOR CUTTING ROOTS

(71) Applicant: Samuel James Baker, Florence, AL (US)

(72) Inventor: Samuel James Baker, Florence, AL (US)

( * ) Notice: Subject to any disclaimer, the term of this patent is extended or adjusted under 35 U.S.C. 154(b) by 0 days.

(21) Appl. No.: 14/880,877

(22) Filed: Oct. 12, 2015

(65) Prior Publication Data

US 2017/0099781 A1    Apr. 13, 2017

(51) Int. Cl.
*A01G 3/06* (2006.01)
*B27G 13/02* (2006.01)
*B27B 33/04* (2006.01)
*A01G 23/06* (2006.01)
*B27G 13/00* (2006.01)

(52) U.S. Cl.
CPC ........... *A01G 3/062* (2013.01); *A01G 23/067* (2013.01); *B27B 33/04* (2013.01); *B27G 13/005* (2013.01); *B27G 13/02* (2013.01); *Y10T 83/9326* (2015.04); *Y10T 83/9374* (2015.04)

(58) Field of Classification Search
CPC .... B27G 13/00; B27G 13/002; B27G 13/005; B27G 13/007; B27G 13/02; B27B 33/04; A01G 23/06; A01G 23/067; A01G 23/065; A01G 3/062; Y10T 83/9326; Y10T 83/9374; Y10T 83/9377; Y10T 83/9379; Y10T 83/9403; Y10T 83/9457; Y10T 83/9464; Y10T 83/9372; F16D 1/06; F16B 5/04
USPC ....... 144/24.12, 334, 231–237, 222; 407/31; 30/306, 307, 263, 276, 347; 56/295
See application file for complete search history.

(56) References Cited

U.S. PATENT DOCUMENTS

| | | | |
|---|---|---|---|
| 1,211,655 A | | 1/1917 | Adams et al. |
| 1,354,828 A | * | 10/1920 | Harvey ................. B23D 71/00 407/29.13 |
| 1,461,376 A | * | 7/1923 | Bartlett ................ B27G 13/005 144/136.95 |
| 2,775,856 A | | 1/1957 | Hoch |
| 3,082,802 A | * | 3/1963 | Dickson ................ B27L 11/007 144/116 |
| 3,323,567 A | * | 6/1967 | Segal .................... B23D 61/025 144/223 |
| 3,508,385 A | | 4/1970 | Carlson |
| 4,589,458 A | * | 5/1986 | McCord, Jr. ......... B23D 47/005 144/218 |

(Continued)

OTHER PUBLICATIONS

Sally Drury, "Stump Grinders", Horticulture Week, Aug. 5, 2011, pp. 39-40, Haymarket Business Publications Ltd., Teddington, UK.

*Primary Examiner* — Andrea Wellington
*Assistant Examiner* — Evan MacFarlane
(74) *Attorney, Agent, or Firm* — Angela Holt; Bradley Arant Boult Cummings LLP

(57) ABSTRACT

A blade assembly for cutting roots is installed on a hand-carried weed cutter or hand-carried side walk edger. The blade assembly has a central blade support that supports a central blade. A plurality of cutting blades are stacked on both sides of the central blade to form a stack of blades. The stack of blades is secured together by fasteners that pass through openings in the blades. The central blade and each of the plurality of cutting blades has a plurality of teeth. Outermost blades in the stack of blades are smaller in diameter than the blades directly adjacent to the outermost blades.

12 Claims, 3 Drawing Sheets

(56) References Cited

U.S. PATENT DOCUMENTS

| | | |
|---|---|---|
| 4,679,385 A | 7/1987 | Carmine |
| 4,697,625 A | 10/1987 | Bolton |
| 4,703,786 A | 11/1987 | Doskocil |
| 4,718,221 A | 1/1988 | Wessel et al. |
| 4,757,848 A | 7/1988 | Mollberg, Jr. |
| 4,783,914 A | 11/1988 | Bowling |
| 5,309,962 A | 5/1994 | McCord, Jr. et al. |
| 5,365,725 A | 11/1994 | McCance |
| 5,613,566 A | 3/1997 | Cox et al. |
| 5,857,505 A | 1/1999 | Zagar |
| 6,092,608 A | 7/2000 | Leger |
| 6,213,931 B1 | 4/2001 | Twardowski et al. |
| 6,293,350 B1 | 9/2001 | Paolo |
| 7,216,471 B1 | 5/2007 | Hassan |
| 7,249,619 B2 | 7/2007 | Berkowitz et al. |
| 7,367,367 B2 | 5/2008 | Bennington |
| 8,186,135 B2 | 5/2012 | Leonardi et al. |
| 2012/0180906 A1* | 7/2012 | Voyer .................. A01G 23/067 144/2.1 |

* cited by examiner

BLADE FOR CUTTING ROOTS

BACKGROUND AND SUMMARY OF THE INVENTION

A blade assembly for cutting roots is installed on a hand-held weed cutter/edger. The blade assembly comprises a central blade support that supports a central blade. A plurality of cutting blades are stacked on both sides of the central blade to form a stack of blades. The stack of blades is secured together by fasteners that pass through openings in the blades. The central blade and each of the plurality of cutting blades comprises a plurality of teeth. Outermost blades in the stack of blades are smaller in diameter than the blades directly adjacent to the outermost blades.

In operation of the device, the cutter is moved in a back and forth motion over a root, left to right, then right to left. The shorter blades on the outside of the stack of blades help to keep the larger blades from getting hung once the blades have begun making resurfacing cuts on the top part of the root.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

The disclosure can be better understood with reference to the following drawings. The elements of the drawings are not necessarily to scale, emphasis instead being placed upon clearly illustrating the principles of the disclosure. Furthermore, like reference numerals designate corresponding parts throughout the several views.

DETAILED DESCRIPTION

Figure 1:
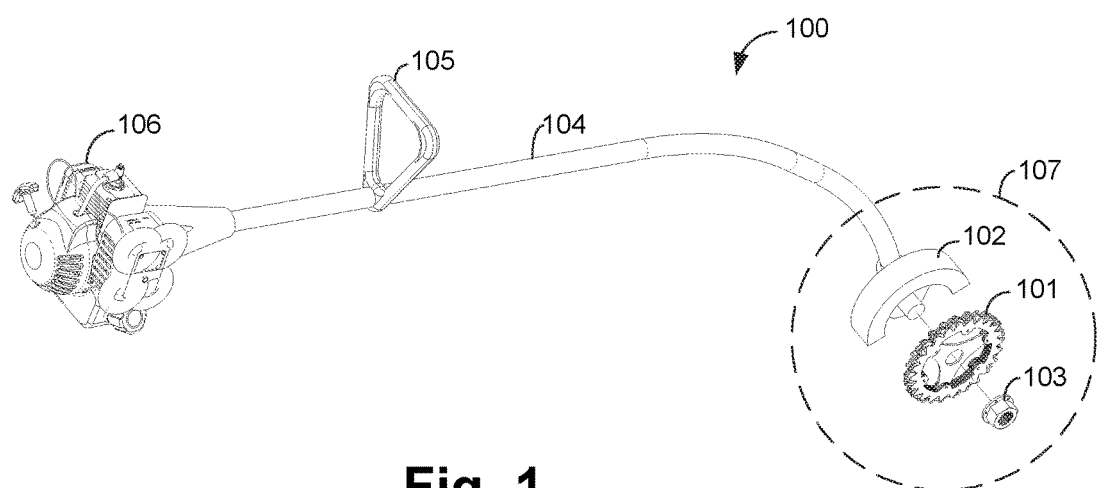
FIG. 1 is a perspective view of a weed cutter with a root cutting blade shown in exploded view.

FIG. 1 is a perspective view of a traditional weed cutter 100, but with a root cutting blade 101 (shown in exploded view) instead of a traditional weed cutting blade. The weed cutter 100 comprises a support 104 with a motor 106 on an upper end and a cutting end 107 on a lower end. A handle 105 is disposed on the support 104 between the motor 106 and the cutting end 107.

The cutting end 107 comprises a blade assembly 101 affixed to the shaft 109 by a nut 103. A shield 102 protects the user (not shown) from flying debris during operation of the cutter 100.

Figure 2:
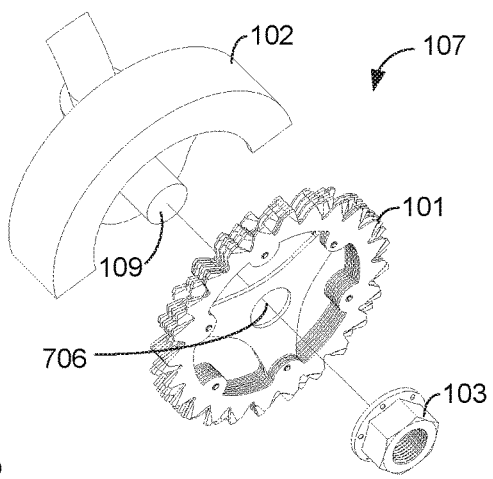
FIG. 2 is an enlarged view of the root cutting blade of FIG. 1.

FIG. 2 is an enlarged exploded view of the cutting end 107 of the cutter 100. The blade assembly 101 comprises an opening 706 that is received by a rotating shaft 109. The nut 103 that affixes the blade assembly 101 to the shaft 109 is a left handed nut in the illustrated embodiment. A compression washer (not shown) is disposed between the nut 103 and the blade assembly 101 in one embodiment.

Figure 3:
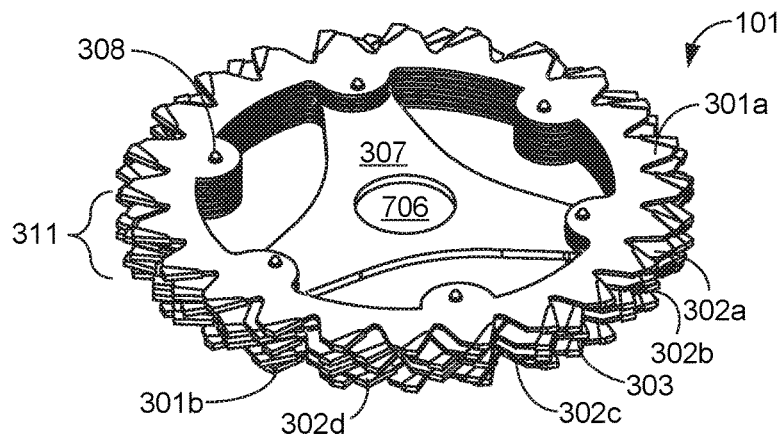
FIG. 3 is an enlarged perspective view of the blade assembly of FIG. 1.

FIG. 3 is an enlarged perspective view of the blade assembly 101 of FIG. 1. The blade assembly 101 comprises a central blade support 307. The blade support comprises the opening 706 that is received by the shaft 109 (FIG. 2). The central blade support 307 is described further herein with respect to FIG. 7.

A plurality of blades 301a-301b, 302a-302d, and 303 are affixed to the central blade support 307 via a plurality of fasteners 308. The plurality of blades 301a-301b, 302a-302d, and 303 are arranged in a "stack" 311, with blades 301a and 301b on the outsides (i.e., top and bottom) of the stack. The blades 301a and 301b comprise substantially identical blades described further herein with respect reference number 301 in FIG. 4.

Figure 5:
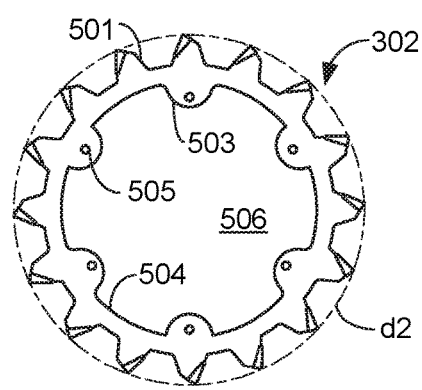
FIG. 5 is a side plan view of the cutting blades adjacent to the outermost cutting blades in the blade stack.

The blades 302a-302d comprise substantially identical blades described further herein with respect reference number 302 in FIG. 5. Blade 302a is the second blade in the stack 311, blade 302b is the third blade in the stack 311, blade 302c is the fifth blade in the stack 311, and blade 302d is the sixth blade in the stack 311. The blade 303 is described further herein with respect to FIG. 6. Blade 303 is in the middle of the stack 311, i.e., is the fourth blade in the stack.

Although the blade assembly 101 of FIG. 3 depicts seven blades 301a-301b, 302a-302d, and 303 arranged in the stack 311, in other embodiments there may be more or fewer blades.

Figure 4:
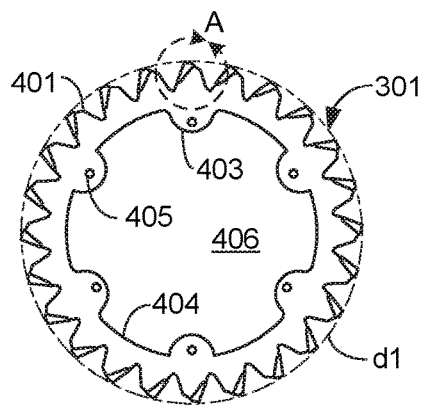
FIG. 4 is a side plan view of the outermost cutting blades in the blade stack.
Figure 8:
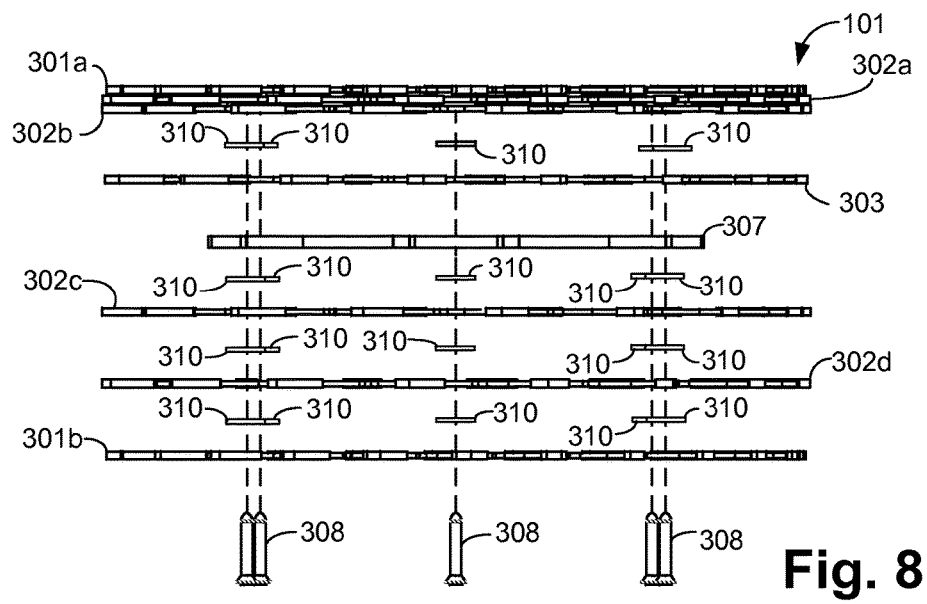
FIG. 8 is a partially-exploded view of the blade stack according to an embodiment of the present disclosure.
Figure 9:
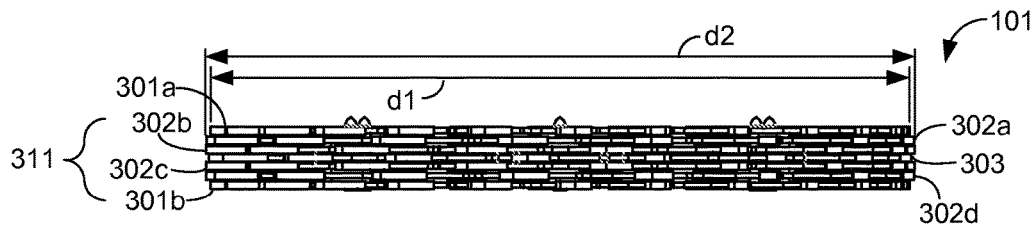
FIG. 9 is a side view of the blade assembly of FIG. 3.

FIG. 4 is a side plan view of the blade 301 (which is referred to as 301a and 301b to designate the location of the blades in FIGS. 3, 8 and 9). The blade 301 comprises a one piece, flat, unitary roughly disk-shaped blade with a plurality of individual teeth 401 extending outwardly in a radial direction from the center of the blade 301. The plurality of teeth 401 extend generally equidistantly from the center of the blade 301 to form an outer diameter "d1." In one embodiment, the diameter d1 is 5.38 inches. In other embodiments, the diameter d1 may be larger or smaller.

In the illustrated embodiment, the blade 301 comprises 24 teeth 401 spaced equidistantly apart around the perimeter of the blade 301. Other embodiments of the blade 301 may comprise more or fewer teeth 401.

The blade 301 comprises a central opening 406 and a generally circular inner edge 404. The opening 406 is between substantially 4.10 and 4.25 inches in one embodiment. A plurality of protrusions 403 extend from the inner edge 404 and comprise openings 405 for receiving fasteners 308 (FIG. 3). The protrusions are generally semi-circular in shape. In the illustrated embodiment, the blade 301 comprises six protrusions 403 for receiving six fasteners 308. In other embodiments, there may be more or fewer protrusions and more or fewer fasteners.

The blade 301 is between approximately 0.045-0.050 inches thick and formed from carbide-tipped steel in one embodiment, and may be other thicknesses and formed from other suitable materials in other embodiments.

Figure 4A:
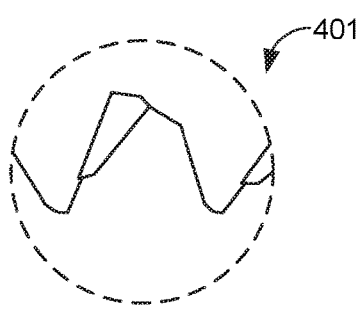
FIG. 4a is an enlarged view of an exemplary blade tooth of FIG. 4.

FIG. 4a is an enlarged view of an exemplary blade tooth 401 of FIG. 4. Blade 301, 302, and central blade 303 are categorized as "Rip saw blades" with positive hook angles between 18 degrees to 22 degrees forward from the center line. Blade 301, 302, and central blade 303 each has a top clearance angle of 12 to 13 degrees from the top of the carbide tooth. Blades 302 and 303 have the same amount of teeth (16 teeth) and teeth spacing that ranges from 1.02 inches to 1.07 inches. Blade 301 has 24 teeth with teeth spacing ranging from 0.069 to 0.072 inches. Blade 301, 302, and 303 each has carbide teeth that has kerf ranging from 0.075 inches to 0.11 inches. The tooth configurations for all blades can be either "Alternate Top Bevel", beveled at 15 degrees on alternating sides on the top of the carbide tips, or "Triple Chip Grind" which is the standard flat top tooth configuration for rip saw blades.

FIG. 5 is a side plan view of the blade 302 (which is referred to as 302a-d to designate the location of the blades in FIGS. 3, 8 and 9). The blade 302 comprises a one piece, flat, unitary roughly disk-shaped blade with a plurality of individual teeth 501 extending outwardly in a radial direction from a center of the blade 302. The plurality of teeth 501 extend generally equidistantly from the center of the blade 302 to form an outer diameter "d2." In one embodiment, the diameter d2 is 5.50 inches. In other embodiments, the diameter d2 may be larger or smaller.

In the illustrated embodiment, the blade 302 comprises sixteen (16) teeth 501 spaced equidistantly apart around the perimeter of the blade 302. Other embodiments of the blade 302 may comprise more or fewer teeth 501. Note that the blade 302 having a smaller number of teeth 501 than the blade 301 means that many of the teeth 401 (FIG. 4) of the blade 301 will be offset from (i.e., not aligned with) the teeth 501 of the blade 302. This difference in the number of teeth in the blades 301 and 302 improves the root-cutting ability of the blade assembly 101.

The blade 302 comprises a central opening 506 and a generally circular inner edge 504. The opening 506 is substantially 4.10 to 4.25 inches in one embodiment. A plurality of protrusions 503 extend from the inner edge 504 and comprise openings 505 for receiving fasteners 308 (FIG. 3). The protrusions are generally semi-circular in shape. In the illustrated embodiment, the blade 302 comprises six protrusions 503 for receiving six fasteners 308. In other embodiments, there may be more or fewer protrusions and more or fewer fasteners.

The blade 302 is approximately 0.045-0.050 inches thick and formed from carbide-tipped steel in one embodiment, and may be other thicknesses and formed from other suitable materials in other embodiments.

Note that the protrusions 403 (FIG. 4) and openings 405 (FIG. 4) align of the blade 301 align with the protrusions 503 and openings 505 of the blade 302 when the blades are stacked as shown in FIG. 3 to form the blade assembly 101 (FIG. 3).

Figure 6:
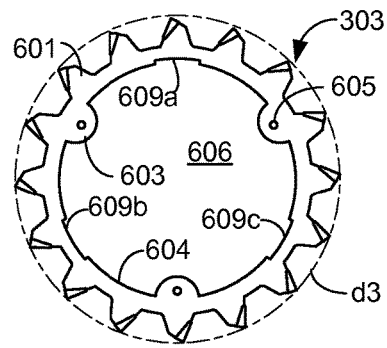
FIG. 6 is a side plan view of the central blade.

FIG. 6 is a side plan view of the blade 303, which comprises a one piece, flat, unitary roughly disk-shaped blade with a plurality of individual teeth 601 extending outwardly in a radial direction from a center of the blade 303. The plurality of teeth 601 extend generally equidistantly from the center of the blade 303 to form an outer diameter "d3." In one embodiment, the diameter d3 is 5.50 inches. In other embodiments, the diameter d3 may be larger or smaller.

In the illustrated embodiment, the blade 303 comprises sixteen (16) teeth 601 spaced equidistantly apart around the perimeter of the blade 303. Other embodiments of the blade 303 may comprise more or fewer teeth 601.

The blade 303 comprises a central opening 606 and a generally circular inner edge 604. The opening 606 is substantially 4.10 to 4.25 inches in one embodiment. A plurality of protrusions 603 extend from the inner edge 604 and comprise openings 605 for receiving fasteners 308 (FIG. 3). The protrusions 603 are generally semi-circular in shape. In the illustrated embodiment, the blade 303 comprises three protrusions 603 for receiving three fasteners 308. In other embodiments, there may be more or fewer protrusions and more or fewer fasteners.

The blade 303 is approximately 045-0.050 inches thick and formed from carbide-tipped steel in one embodiment, and may be other thicknesses and formed from other suitable materials in other embodiments.

Note that the protrusions 603 and openings 605 align with three of the six protrusions 503 (FIG. 5) and 403 (FIG. 4) and openings 505 (FIG. 5) and openings 405 (FIG. 4) of the blades 301 and 302 when the blades are stacked as shown in FIG. 3 to form the blade assembly 101 (FIG. 3), as further discussed herein.

The blade 303 further comprises indentations 609a, 609b, and 609c, one of each being disposed between adjacent protrusions 603. The indentations 609a, 609b, and 609c comprise a curved surface that receives the blade support 307, as further described with respect to FIG. 7 herein.

Figure 7:
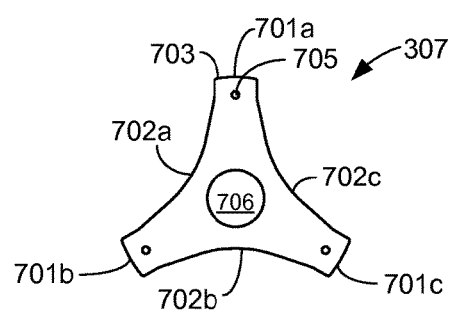
FIG. 7 is a side plan view of the blade support.

FIG. 7 is a side plan view of the blade support 307. The blade support 307 is roughly triangle shaped with three legs 701a, 701b, and 701c extending from a central opening 706 and spaced generally equidistant from one another. The central opening 706 is sized to be installed on the shaft 109 (FIG. 2).

Curved side 702a extends between the leg 701a and the leg 702b; curved side 702b extends between the leg 701b and the leg 701c; and curved side 702c extends between the leg 701c and the leg 701a. The legs 701a, 701b, and 701c each comprise a curved surface 703 that joins with the curved surfaces of the indentations 609a, 609b, and 609c. In other words, the indentation 609a receives the leg 701a; the indentation 609b receives the leg 701b, and the indentation 609c receives the leg 701c.

Each leg 701a, 701b, and 701c comprises an opening 705 which receives a fastener 308 (FIG. 3). The openings 705 in the legs 701a, 701b, and 701c align with alternate openings 505 (FIG. 5) and openings 405 (FIG. 4) of the blades 301 and 302 when the blades are stacked as shown in FIG. 3 to form the blade assembly 101 (FIG. 3), as further discussed herein.

The blade support 307 is approximately 0.085-0.092 inches thick and formed from steel in one embodiment, and may be other thicknesses and formed from other suitable materials in other embodiments.

FIG. 8 is a partially exploded side view of the blade assembly 101 of FIG. 3, showing how the blades 301a-b, 302a-d, and 303 are stacked together and joined by fasteners 308. As discussed herein, the blades 301a and 301b are on the outer sides of the blade assembly 101. The blade 302a is next to the blade 301a, followed by the blade 302b. Next in the stack is the central blade 303, which fits onto the blade support 307. The blade 303 and blade support 307 are in the middle of the stack 311 and are sandwiched between the blade 302b and blade 302c. The blade 302d is adjacent to the blade 302c, and the blade 301b completes the stack.

Spacers 310 are disposed between adjacent blades. The spacers 310 are small aluminum washers in the illustrated embodiment. The spacers are 0.32 to 0.37 inches in outside diameter and 0.03-0.06 inches thick in one embodiment. Each spacer 310 comprises a central opening (not shown) to receive the fastener 308. The fasteners 308 are standard rivets in the illustrated embodiment.

FIG. 9 is a side view of the blade assembly 101 showing the stack 311. Note that the diameter d1 of the blade 301*a* (and 301*b*) is less than the diameter d2 of the blade 302*a* (and 302*b*, *c*, and *d*). In one embodiment, the diameter of the blades 301*a* and 301*b* are 5.38 inches and the diameter of the blades 302*a-d* and blade 303 are 5.50 inches. The outer blades 301*a* and 301*b* being smaller in diameter than the inner blades 302*a-d* improves the root-cutting action of the blade assembly 101. The outer blades 301*a* and 301*b* being smaller in diameter than the inner blades 302*a-d* promotes more smooth cutting of roots. This is because in operation of the device, the blade assembly 101 is passed back and forth over the root/stump to be cut. The shorter blades on the outside of the stack 311 help the larger blades on the inside from getting hung up on the roots.

The diameter d3 is the same as the diameter d2 of blades 302 *a-d*. When fully assembled, the stack 311 is between ¾ inches and one inch thick in one embodiment.

The invention claimed is:

1. A blade assembly comprising:
a central blade support supporting a central blade;
a plurality of cutting blades stacked on both sides of the central blade to form a stack of blades, the stack of blades secured together by fasteners, the central blade and each cutting blade comprising a plurality of teeth, the plurality of cutting blades comprising an outermost pair of blades, the outermost pair of blades smaller in diameter than blades directly adjacent to the outermost pair of blades, the central blade support comprising three equidistantly-spaced blade support protrusions extending from a central opening, the central opening configured for installation on a shaft of a hand-held weed-cutting machine, the central blade comprising three equidistantly-spaced indentations configured to receive the three blade support protrusions of the central blade support, the central blade further comprising three equidistantly-spaced inner edge protrusions, each inner edge protrusion comprising an opening configured to receive one of the fasteners.

2. The blade assembly of claim 1, the plurality of cutting blades stacked on both sides of the central blade each comprising a plurality of inner edge protrusions, each inner edge protrusion of the cutting blades comprising an opening configured to receive one of the fasteners.

3. The blade assembly of claim 2, wherein at least some of the openings on the plurality of inner edge protrusions on the plurality of cutting blades stacked on both sides of the central blade are aligned with the openings on the inner edge protrusions on the central blade, such that the fasteners can pass through the openings on the inner edge protrusions of the plurality of cutting blades and of the central blade and affix all of the blades together.

4. The blade assembly of claim 1, wherein the blade assembly comprises seven blades, the central blade and three blades on each side of the central blade.

5. The blade assembly of claim 4, the outermost pair of blades each comprising more teeth than the remaining blades.

6. The blade assembly of claim 5, the outermost pair of blades each comprising 24 teeth and the remaining blades each comprising 16 teeth.

7. A blade assembly comprising:
a blade support configured to support a plurality of cutting blades in a stack, the blade support comprising a central opening configured to attach to a shaft of a weed-cutting apparatus, the blade support supporting a central blade, the blade support further comprising three equidistantly-spaced blade support protrusions extending from the central opening, the central blade comprising three equidistantly-spaced indentations configured to receive the three protrusions of the central blade support, the blade further comprising three equidistantly-spaced inner edge protrusions, each inner edge protrusion comprising an opening configured to receive one of a plurality of fasteners,
the plurality of cutting blades comprising an equal number of the cutting blades stacked on both sides of the central blade to form the stack of blades, the plurality of cutting blades affixed to each other and the blade support with the fasteners, each cutting blade comprising a plurality of teeth, the plurality of cutting blades comprising an outermost pair of blades, the outermost pair of blades smaller in diameter than blades adjacent to the outermost pair of blades.

8. The blade assembly of claim 7, wherein the blade assembly comprises seven blades, the central blade and three blades on each side of the central blade.

9. The blade assembly of claim 8, the outermost pair of blades each comprising more teeth than the cutting blades inward of the outermost pair of blades.

10. The blade assembly of claim 9, the outermost pair of blades each comprising 24 teeth and the cutting blades inward of the outermost pair of blades each comprising 16 teeth.

11. A blade assembly comprising:
a blade support configured to support a plurality of cutting blades in a stack, the blade support comprising a central opening configured to attach to a shaft of a weed-cutting apparatus, the blade support supporting a central blade, an equal number of the cutting blades stacked on both sides of the central blade to form the stack of blades, the blade support comprising three equidistantly-spaced protrusions extending from the central opening;
the plurality of cutting blades affixed to each other and the blade support with a plurality of fasteners, each cutting blade comprising a plurality of teeth, the plurality of cutting blades comprising an outermost pair of blades, the outermost pair of blades smaller in diameter than blades adjacent to the outermost pair of blades,
the plurality of cutting blades stacked on both sides of the central blade each comprising a plurality of inner edge protrusions extending from an inner edge of the cutting blades, each inner edge protrusion comprising an opening configured to receive one of the fasteners.

12. The blade assembly of claim 11, wherein at least some of openings on the plurality of protrusions on the plurality of cutting blades stacked on both sides of the central blade are aligned with openings on protrusions on the central blade, such that the fasteners can pass through the openings on the plurality of protrusions on the plurality of cutting blades and the central blade and affix all of the blades together.

\* \* \* \* \*